US009288435B2

(12) United States Patent
Lachapelle et al.

(10) Patent No.: US 9,288,435 B2
(45) Date of Patent: Mar. 15, 2016

(54) SPEAKER SWITCHING DELAY FOR VIDEO CONFERENCING

(71) Applicant: GOOGLE INC., Mountain View, CA (US)

(72) Inventors: Serge Lachapelle, Vallentuna (SE); André Susano Pinto, Stockholm (SE); Åsa Persson, Stockholm (SE); Magnus Flodman, Tullinge (SE)

(73) Assignee: GOOGLE INC., Mountain View, CA (US)

( * ) Notice: Subject to any disclaimer, the term of this patent is extended or adjusted under 35 U.S.C. 154(b) by 57 days.

(21) Appl. No.: 13/894,232

(22) Filed: May 14, 2013

(65) Prior Publication Data
US 2015/0201161 A1   Jul. 16, 2015

Related U.S. Application Data

(60) Provisional application No. 61/805,814, filed on Mar. 27, 2013.

(51) Int. Cl.
*H04N 7/15* (2006.01)
(52) U.S. Cl.
CPC ....................................... *H04N 7/15* (2013.01)
(58) Field of Classification Search
USPC ..................... 348/14.08, 14.09, 14.01, 14.07; 709/204; 704/270
See application file for complete search history.

(56) References Cited

U.S. PATENT DOCUMENTS

| 7,822,811 | B2 | 10/2010 | Moore et al. | |
| 8,334,891 | B2 | 12/2012 | Graham et al. | |
| 2005/0010638 | A1* | 1/2005 | Richardson et al. | 709/204 |
| 2007/0294346 | A1* | 12/2007 | Moore et al. | 709/204 |
| 2008/0068446 | A1* | 3/2008 | Barkley et al. | 348/14.07 |
| 2011/0093273 | A1 | 4/2011 | Lee et al. | |
| 2012/0133728 | A1 | 5/2012 | Lee | |
| 2013/0169742 | A1* | 7/2013 | Wu et al. | 348/14.08 |
| 2014/0085404 | A1* | 3/2014 | Kleinsteiber et al. | 348/14.08 |
| 2014/0135072 | A1* | 5/2014 | Sawada | 455/566 |

* cited by examiner

*Primary Examiner* — Joseph J Nguyen
(74) *Attorney, Agent, or Firm* — Birch, Stewart, Kolasch & Birch, LLP

(57) ABSTRACT

Provided are methods for switching active speakers during a video conferencing session. An image of an active speaker in a video conference is provided for presentation in a main display area of a display screen, where the active speaker is one of a plurality of users participating in the video conference over a network. When, a new active speaker out of the users participating in the video conference is detected, resolutions of available video streams received for each of the users are determined. In response to determining that the resolution of the video stream received for the new active speaker is below a threshold resolution, the image of the active speaker continues to be provided for presentation in the main display area until a predetermined period of time has elapsed.

21 Claims, 5 Drawing Sheets

SPEAKER SWITCHING DELAY FOR VIDEO CONFERENCING

The present application claims priority to U.S. Provisional Patent Application Ser. No. 61/805,814, filed Mar. 27, 2013, the entire disclosure of which is hereby incorporated by reference.

BACKGROUND

Traditional video conferencing systems depend on a server that takes incoming video and re-encodes it to match the capabilities of the receiver. These capabilities include, for example, screen size, computational power, network capacity, and network performance. For example, a well-performing computer with a large display screen and an uncongested network will likely receive full-resolution video, while a computer with lower capabilities might receive less than a full-resolution version of the video. Re-encoding video data is costly in terms of both latency and server resources.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods, systems, and apparatus for signal processing. More specifically, aspects of the present disclosure relate to delaying the switch of an active speaker during a video conference session.

Embodiments of the present disclosure relate to methods and systems for delaying the switch of a video stream during a video conferencing session until either a maximum delay time is met or a full-quality version of the video stream arrives.

One embodiment of the present disclosure relates to a method for switching active speakers during a video conferencing session, the method comprising: providing for presentation in a main display area of a display screen, an image of an active speaker in a video conference, wherein the active speaker is one of a plurality of users participating in the video conference over a network; detecting a new active speaker of the plurality of users participating in the video conference; determining resolutions of video streams received for each of the plurality of users participating in the video conference; in response to determining that the resolution of the video stream received for the new active speaker is below a threshold resolution, continuing to provide for presentation in the main display area the image of the active speaker; and in response to determining that the resolution of the video stream received for the new active speaker is above the threshold resolution, providing for presentation in the main display area of the display screen an image of the new active speaker corresponding to the resolution of the video stream received for the new active speaker, wherein the image of the new active speaker is provided for presentation in place of the image of the active speaker.

In another embodiment, the image of the active speaker continues to be provided for presentation in the main display area until a predetermined period of time has elapsed.

In another embodiment, the method for switching active speakers further comprises, in response to determining that the predetermined period of time has elapsed, providing for presentation in the main display area of the display screen an image of the new active speaker corresponding to a highest resolution video stream received for the new active speaker, wherein the image of the new active speaker is provided for presentation in place of the image of the active speaker.

In yet another embodiment, the method for switching active speakers further comprises providing for presentation in a secondary display area of the display screen, images of non-active participants in the video conference, wherein the non-active participants are the plurality of users other than the active speaker.

Another embodiment of the present disclosure relates to a method for switching active speakers during a video conferencing session, the method comprising: providing for presentation in a main display area of a display screen, an image of an active speaker in a video conference, wherein the active speaker is one of a plurality of users participating in the video conference over a network; detecting a new active speaker of the plurality of users participating in the video conference; determining resolutions of video streams received for each of the plurality of users participating in the video conference; comparing the resolution of the video stream received for the new active speaker with the resolution of the video stream received for the active speaker; in response to determining that the resolution of the video stream received for the new active speaker is lower than the resolution of the video stream received for the active speaker, continuing to provide for presentation in the main display area the image of the active speaker; and in response to determining that the image of the active speaker has continued to be provided for presentation in the main display area for a predetermined period of time, providing for presentation in the main display area of the display screen an image of the new active speaker corresponding to a highest resolution video stream received for the new active speaker, wherein the image of the new active speaker is provided for presentation in place of the image of the active speaker.

In another embodiment, the method for switching active speakers further comprises, in response to determining, based on the comparison, that the resolution of the video stream received for the new active speaker is higher than the resolution of the video stream received for the active speaker, providing for presentation in the main display area of the display screen an image of the new active speaker corresponding to the resolution of the video stream received for the new active speaker, wherein the image of the new active speaker is provided for presentation in place of the image of the active speaker.

In one or more other embodiments, the methods and systems presented herein may optionally include one or more of the following additional features: the predetermined period of time is based on one or more characteristics of the network; the predetermined period of time is adjustable during the video conference session based on a change to the one or more characteristics of the network; the predetermined period of time is based on one or more characteristics of the plurality of users participating in the video conference; the predetermined period of time is adjustable during the video conference session based on a change to the one or more characteristics of the plurality of users participating in the video conference; the predetermined period of time is customized for each of the plurality of users participating in the video conference; the predetermined period of time is uniform for each of the plurality of users participating in the video conference; the predetermined period of time is set at half of the round-trip communication time between each of the plurality of users and a server configured for use in the video conference; the resolutions of the video streams received for each of the plurality of users is at least one of Quarter Video Graphics Array (QVGA), Video Graphics Array (VGA), and 720p; the threshold resolution is 720p; the image of the active speaker is higher resolution than the images of the non-active participants.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
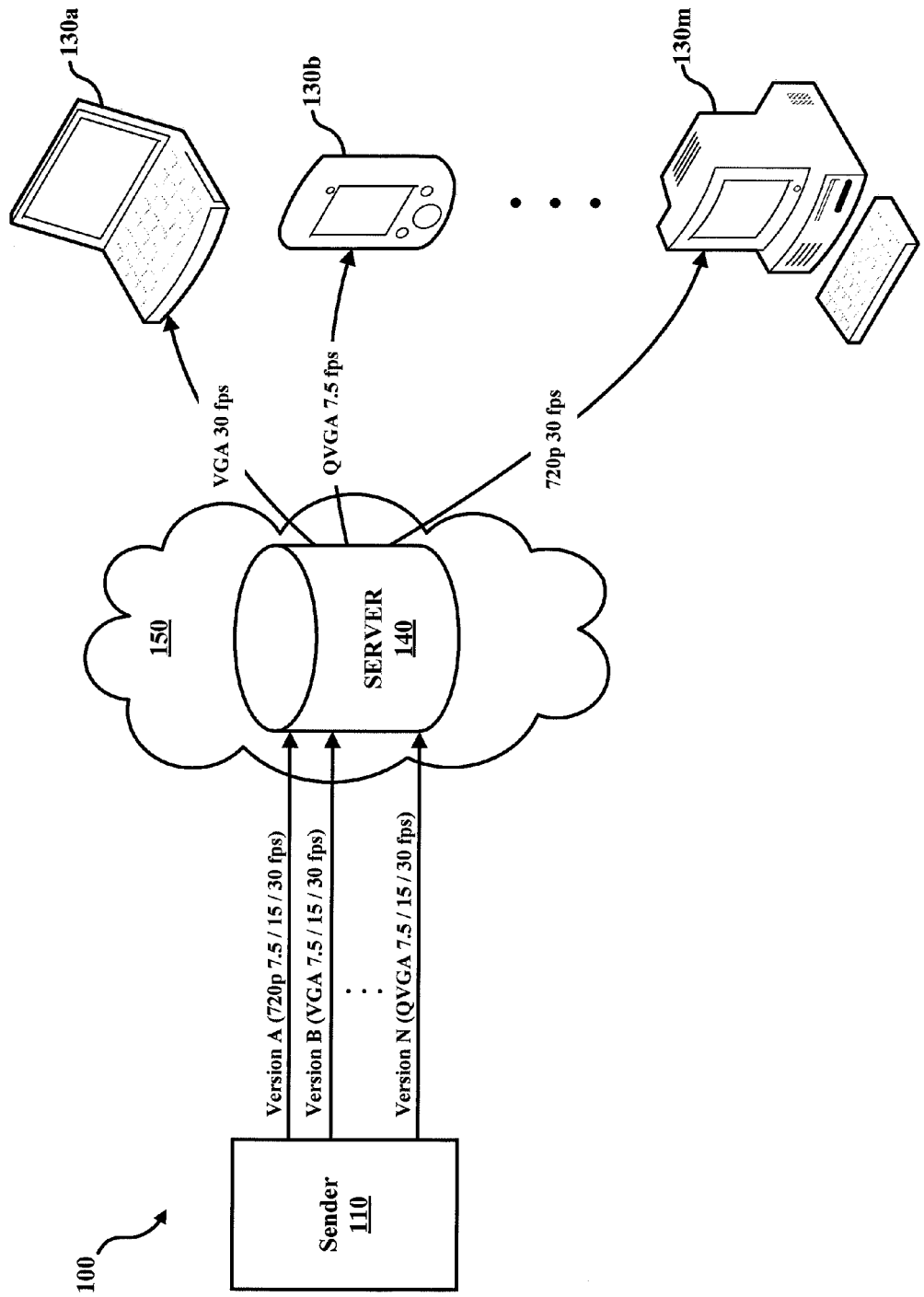
FIG. 1 is a block diagram illustrating an example system for transmitting multiple versions of a video stream in which one or more embodiments described herein may be implemented.

The headings provided herein are for convenience only and do not necessarily affect the scope or meaning of the claimed embodiments.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for delaying the switch of a video stream during a video conferencing session until either a maximum delay time is met or a full-quality version of the video stream arrives.

As will be further described herein, a video codec may be configured to support high-definition video by utilizing simulcast transmission techniques. For example, during a multi-party video conference involving clients (e.g., users) communicating over a network, multiple (e.g., three) versions of a video image (e.g., video stream) may be simultaneously transmitted over the network from each of the participating clients. One transmission of the video image may be in a thumbnail resolution (e.g., 320×240 pixels, sometimes referred to as QVGA (Quarter Video Graphics Array)), which is a low-resolution version of the image often used, for example, with portable electronic devices such as mobile telephones and personal digital assistants (PDA). Transmitting the video image in QVGA requires very little bandwidth.

Along with the low-resolution version of the video image, two additional versions of the video image may be simultaneously transmitted over the network. For example, a second version of the same video image may be simultaneously transmitted over the network in a resolution referred to as VGA (Video Graphics Array), while a third version of the video image is transmitted in a high-resolution (e.g., 1280×720 pixels) format referred to as 720p.

FIG. 1 illustrates an example system for distributing multiple versions of a video stream in which one or more of the embodiments described herein may be implemented. In accordance with at least one embodiment, the methods of the present disclosure may be utilized in a video conferencing system 100 in which multiple versions of a video image may be transmitted (e.g., simulcast transmission) from a sender 110 over a network 150 to receivers 130*a*, 130*b*, through 130*n* (where "m" is an arbitrary number). For example, three versions of a video image (e.g., Version A, Version B, up through Version N (where "N" is an arbitrary number)) may be transmitted from the sender 110 for distribution over communications network 150 to receivers 130*a*, 130*b*, through 130*m*. In accordance with at least one embodiment, the three versions of the video image are transmitted from the sender 110 to a server 140 which then distributes (or forwards, relays, etc.), to each of the receivers 130*a*, 130*b*, through 130*m*, one of the three versions of the image that is compatible with the particular receiver's device capabilities and characteristics.

According to at least one embodiment, Version A of the video image may be transmitted in 720p format, Version B transmitted in VGA format, and Version N transmitted in QVGA format. It should be noted, however, that the video stream from sender 110 may be transmitted in one or more other formats or resolutions in addition to or instead of the example formats described above.

In simulcast transmission, the server 140 does not need to re-encode incoming streams based on capabilities of the receivers 130*a*, 130*b*, 130*m*. Instead the server 140 may be configured to strip the incoming video stream and keep only what matches (e.g., is compatible with) the particular receiver's (e.g., one of receivers 130*a*, 130*b*, or 130*m*) capabilities. Such an approach avoids delay caused by re-encoding the video, and also has very low CPU overhead. For example, the server 140 may keep different versions of the video stream for each of the receivers 130*a*, 130*b*, up through 130*m*, where the video is sent to receiver 130*a* (e.g., laptop computer) in VGA format, to receiver 130*b* (e.g., portable handheld device or smartphone) in QVGA format, and to receiver 130*m* (e.g., desktop computer) in 720p format.

Figure 2:
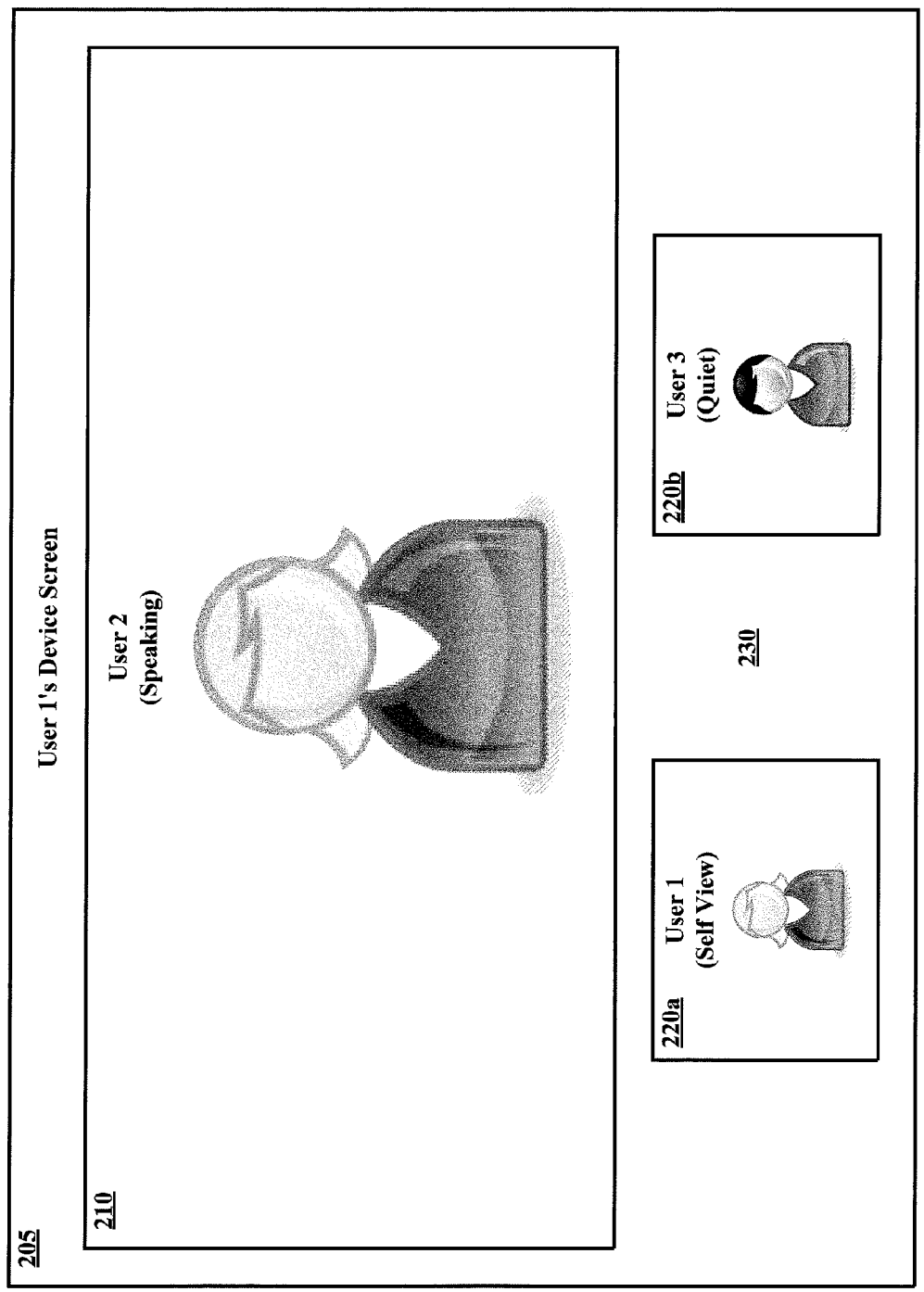
FIG. 2 is an example user interface screen that may be used during a video conference, where an active speaker appears in a main display area of the screen according to one or more embodiments described herein.

FIG. 2 illustrates an example user interface screen that may be used during a video conference between multiple participants, in accordance with one or more embodiments described herein. The user interface screen may be, for example, a device screen 205 of a user (e.g., User 1) who is participating in a video conference with two other users (e.g., Users 2 and 3). In such a video conferencing environment, the participant who is currently speaking (also referred to herein as the "active speaker," which in the present example is User 2) may appear as a large image in a main display area 210 on the display screens of the other participants (e.g., device screen 205 of User 1). Additionally, while the current active speaker appears as a large image in the main display area 210, the other participants (User 1 and User 3) may appear as thumbnail images 220a and 220b in a secondary area 230 (e.g., the lower portion or some other portion different than the main display area 210) of the device screen 205. In at least one embodiment, the thumbnail images 220a and 220b may be video streams that a conferencing server (e.g., server 140 as shown in FIG. 1) has stripped to the bare minimum to save network resources. For example, when a non-active participant (e.g., sender 110 as shown in FIG. 1) sends three versions of the participant's video stream, the server simply does not forward the highest two resolution versions of the video stream to the other endpoints (e.g., participants) in the conference. As a result, the sending participant will appear to the other participants as one of the thumbnail images 220a and 220b in the secondary area 230 of the display screen.

When a speaker switch event occurs, which may be triggered by a click or a change in the active speaker, the received video for the new main display 210 must scale from thumbnail resolution (e.g., bare minimum size) to full-size resolution. For example, continuing with the scenario described above and illustrated in FIG. 2, if User 3 begins to speak (thus becoming the new active speaker), then a speaker switch event has occurred and the thumbnail video image 220b of User 3 must be scaled-up to the size of the main display 210 on User 1's device screen 205. Such a process may include client server signaling, and the scaling-up of the video can take a few moments.

Figure 3:
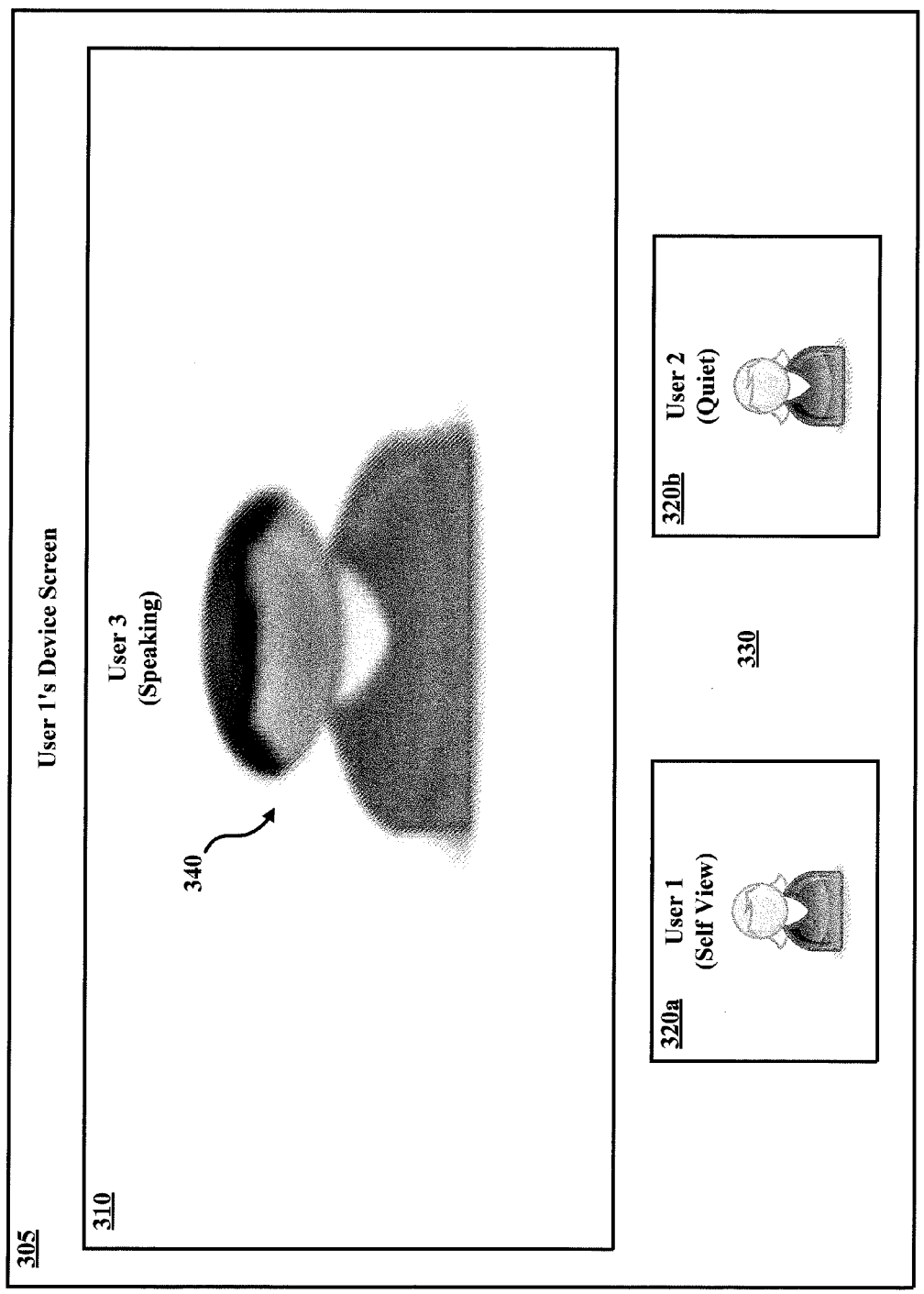
FIG. 3 is an example user interface screen showing an example of a low-quality image that may be displayed following a speaker switching event during a video conference.

The result of this scaling-up process is illustrated FIG. 3, where for a moment of time the thumbnail version of the image of User 3 (e.g., image 220b) is displayed in the main display area 310 of the device screen 305 of User 1. The thumbnail version of the image of User 3 is a low-resolution picture. Therefore, when the thumbnail version of the image is stretched to fit in the main display area 310, the resulting image 340 looks sub-par (e.g., appears as a lower-quality image than it otherwise should) until the best possible (e.g., optimal) version of the video stream of User 3 reaches the client (e.g., User 1).

Given the degradation in video image quality that may occur as a result of a speaker switching event, as described above and illustrated in FIG. 3, embodiments of the present disclosure provide a method for delaying the switch to a new video stream for an active speaker until either a maximum delay time has been met or until the full-quality (e.g., optimal resolution) version of the video stream arrives.

It should be noted that the maximum delay time (e.g., delay threshold) should not be too long so as to provide a prolonged "switching" experience for the main speaker. For example, establishing too long of a maximum delay time will result in an extended lag between the user "clicking" or the new speaker speaking and the switch event occurring. In accordance with one or more embodiments described herein, delaying the main speaker video switch with half of a round-trip time between the end client and server will mask the "resolution switch up" that causes a low resolution image to be shown, thereby improving the user experience that results.

Figure 4:
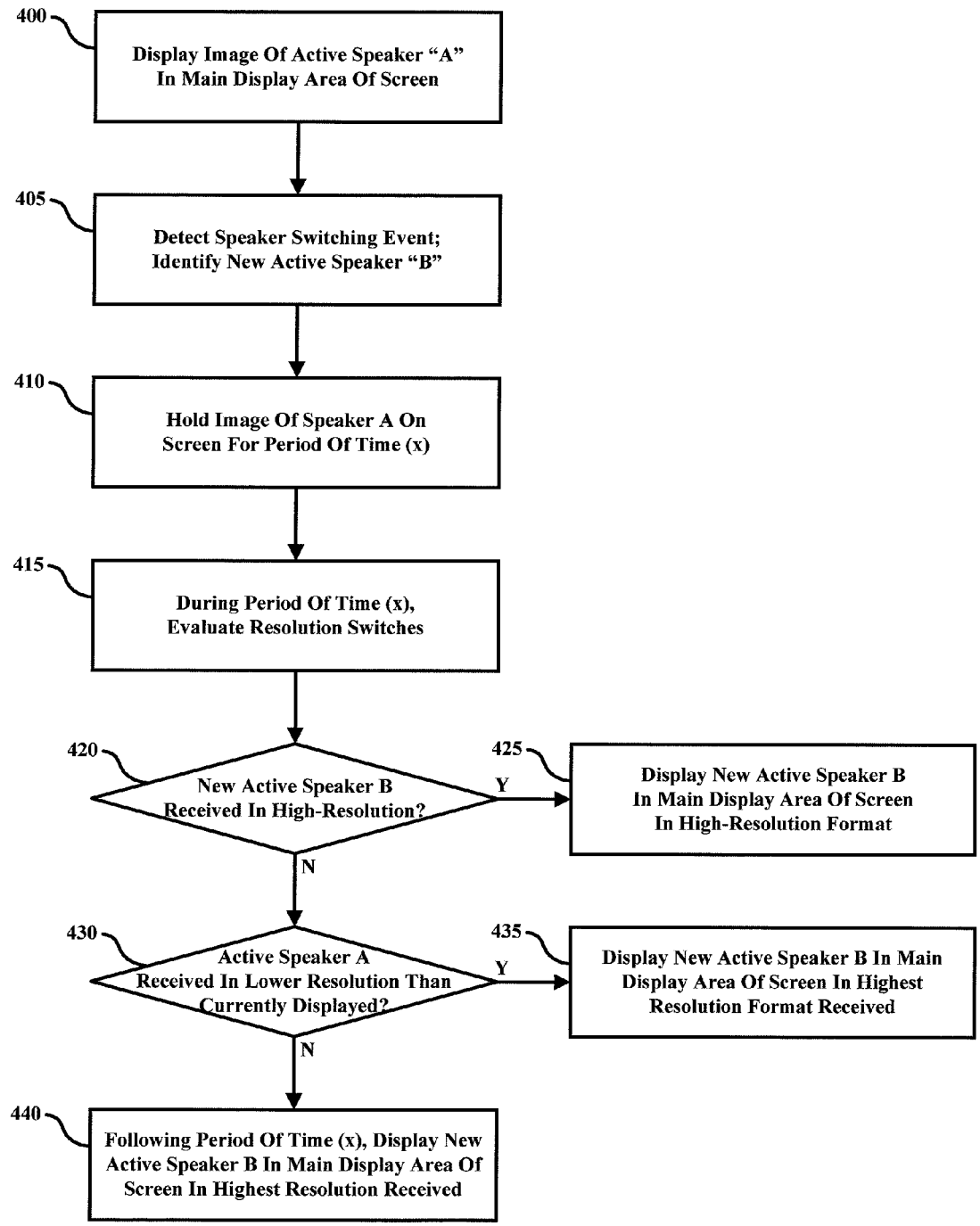
FIG. 4 is an example method for delaying the switch of a video stream until a maximum delay is met or a full-quality version of the stream arrives according to one or more embodiments described herein.

FIG. 4 is an example process for delaying the switch of a video stream until a maximum delay is met or a full-quality version of the video stream arrives. In accordance with one or more embodiments of the present disclosure, the example process shown may be implemented during a multi-party video conference session between multiple clients communication over a network (e.g., sender 110 communicating with one or more of receivers 130a, 130b, and 130m over network 150, as shown in the example system of FIG. 1).

At block 400, an image of an active speaker (e.g., User 2 as shown in FIG. 2, who may be referred to as "Speaker A" for purposes of the following description), may be displayed in the main display area of a device screen (e.g., main display area 210 of device screen 205 as shown in the example of FIG. 2).

At block 405, a speaker switching event may be detected such that a new active speaker is identified (e.g., User 3 as shown in FIG. 3, who may be referred to as "Speaker B" for purposes of the following description).

At block 410, the image of Speaker A may continue to be displayed in the main display area of the device screen for a period of time (x). According to at least one embodiment, this period of time (x) may be predetermined before the start of the video conference session or may be established during the video conference session. In either or both such embodiments, the period of time (x) may be based on one or more characteristics of the network, one or more of the clients involved in the session, or any combination of thereof. The period of time (x) may also be an adjustable parameter such that the period of time (x) can be adjusted during the video conference session based on a change to one or more characteristics of the network, the clients, or any combination thereof. Additionally, the period of time (x) may be established to be the same for each of the clients participating in the video conference session, or instead may be customized for each of the clients.

In accordance with at least one embodiment, the period of time (x) may be set at half of the round-trip communication time (e.g., over the network) between a client and a server configured for use in the video conference session (e.g., key frame storage server 140, as shown in the example system of FIG. 1).

At block 415, during the period of time (x) that the image of Speaker A continues to be displayed in the main display area of the device screen (e.g., at block 410), the resolutions of the available video streams for each of the users may be evaluated.

At block 420, a determination may be made as to whether the video stream for the new active speaker (Speaker B) has been received (or is available at the given client) in high-resolution format (e.g., high-definition format, such as 720p).

If it is determined at block 420 that the video stream for the new active speaker (Speaker B) has not been received in high-resolution format, then at block 425 a high-resolution image of the new active speaker (Speaker B) may be displayed in the main display area of the screen.

If it is determined at block 420 that the video stream for the new active speaker (Speaker B) has not been received in high-resolution format, then at block 430 at determination may be made as to whether the video stream for Speaker A (an image of whom is still being displayed in the main display area of the device screen, as described above with respect to block 410) has been received in a resolution lower than that which is currently being displayed for Speaker A (from block 410).

If it is determined at block 430 that the video stream for Speaker A has been received in a resolution lower than that which is currently being displayed for Speaker A, the process may move to block 435 where an image of the new active speaker (Speaker B) may be displayed in the main display area of the device screen in the highest resolution received (at the given client) for the new active speaker. On the other hand, if it is determined at block 430 that the video stream for Speaker A has not been received in a resolution lower than that which is currently being displayed for Speaker A, the process may move to block 440 where, following the expiration of the period of time (x), an image of the new active speaker (Speaker B) may be displayed in the main display area of the device screen in the highest resolution received for the new active speaker.

Figure 5:
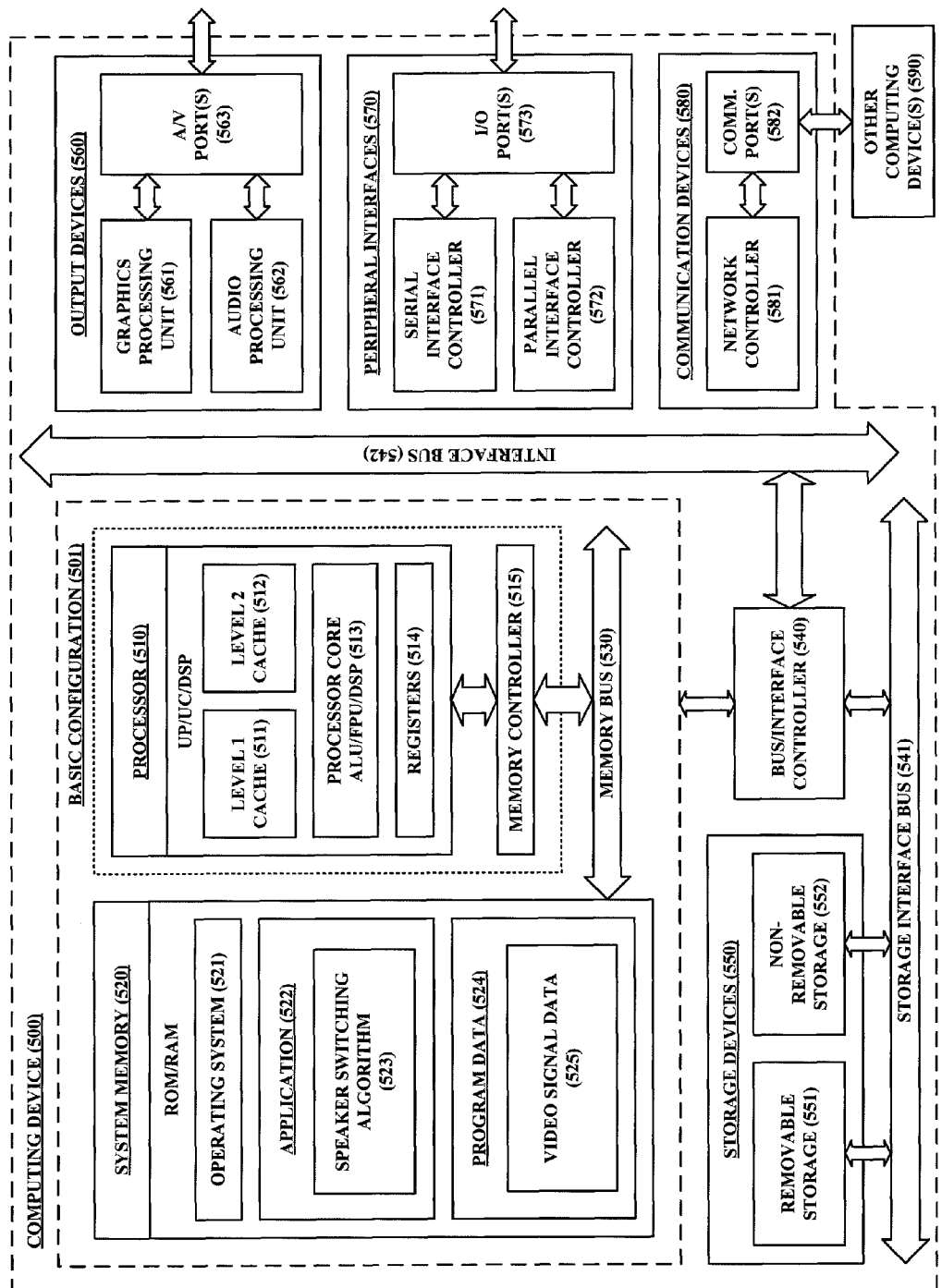
FIG. 5 is a block diagram illustrating an example computing device arranged for delaying the switch of a video stream during a video conference until a maximum delay is met or a full-quality version of the stream arrives according to one or more embodiments described herein.

FIG. 5 is a block diagram illustrating an example computing device 500 that is arranged delaying the switch of a video stream during a video conference until a maximum delay is met or a full-quality version of the stream arrives in accordance with one or more embodiments of the present disclosure. For example, computing device 500 may be configured to delay the switch to a video stream for a newly active participant in a video conference in order to prevent a lower-quality image of the participant from being displayed, as described above. In a very basic configuration 501, computing device 500 typically includes one or more processors 510 and system memory 520. A memory bus 530 may be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510.

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In one or more embodiments, application 522 may include a speaker switching algorithm 523 that is configured to delay the switch to a video image of a new active (e.g., main) speaker until either a maximum delay time has been met or a full-quality version of the video image for the new active speaker has been received. For example, in accordance with one or more embodiments the speaker switching algorithm 523 may be configured to continue displaying the video image of the previous main speaker while evaluating new versions of video images of the participants during a speaker switch event. Depending on which versions of the video stream for the new active speaker have been received, the speaker switching algorithm 523 may choose to immediately switch to a video image of the new active speaker, delay the switch to the video image of the new active speaker until an optimal version of the video stream is received, or delay the switch to the video image of the new active speaker until a maximum delay time has occurred.

Program Data 524 may include video signal data 525 that is useful for evaluating versions of video streams that have been received and determining whether to delay a switch to a video image of a new active speaker. In some embodiments, application 522 can be arranged to operate with program data 524 on an operating system 521 such that the speaker switching algorithm 523 uses the video signal data 525 to either switch to a video image of a new active speaker or delay the switch to the video image of the new active speaker until an optimal version of the video stream for the new active speaker is available, or until a maximum delay time has occurred.

Computing device 500 can have additional features and/or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562, either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573.

An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for switching active speakers during a video conferencing session, the method comprising:
providing for presentation in a main display area of a display screen, an image of an active speaker in a video conference, wherein the active speaker is one of a plurality of users participating in the video conference over a network;
detecting a new active speaker of the plurality of users participating in the video conference;
determining resolutions of video streams received for each of the plurality of users participating in the video conference;
in response to determining that the resolution of the video stream received for the new active speaker is below a threshold resolution, continuing to provide for presentation in the main display area the image of the active speaker for a period of time adjustable during the video conference session based on a change to one or more characteristics of the network and one or more characteristics of the plurality of users; and
in response to determining that the resolution of the video stream received for the new active speaker is above the threshold resolution, providing for presentation in the main display area of the display screen an image of the new active speaker corresponding to the resolution of the video stream received for the new active speaker, wherein the image of the new active speaker is provided for presentation in place of the image of the active speaker.

2. The method of claim 1, wherein the period of time is predetermined before the start of the video conference session.

3. The method of claim 1, further comprising:
in response to determining that the period of time has elapsed, providing for presentation in the main display area of the display screen an image of the new active speaker corresponding to a highest resolution video stream received for the new active speaker, wherein the image of the new active speaker is provided for presentation in place of the image of the active speaker.

4. The method of claim 1, further comprising:
detecting a change to one or more characteristics of the network and one or more characteristics of the plurality of users.

5. The method of claim 4, further comprising:
adjusting the period of time based on the detected change to one or more characteristics of the network and one or more characteristics of the plurality of users.

6. The method of claim 1, wherein the period of time is customized for each of the plurality of users participating in the video conference.

7. The method of claim 1, wherein the period of time is uniform for each of the plurality of users participating in the video conference.

8. The method of claim 1, wherein the period of time is set at half of the round-trip communication time between each of the plurality of users and a server configured for use in the video conference.

9. The method of claim 1, wherein the resolutions of the video streams received for each of the plurality of users is at least one of Quarter Video Graphics Array (QVGA), Video Graphics Array (VGA), and 720p.

10. The method of claim 1, wherein the threshold resolution is 720p.

11. The method of claim 1, further comprising providing for presentation in a secondary display area of the display screen, images of non-active participants in the video conference, wherein the non-active participants are the plurality of users other than the active speaker.

12. The method of claim 11, wherein the image of the active speaker is higher resolution than the images of the non-active participants.

13. A method for switching active speakers during a video conferencing session, the method comprising:
providing for presentation in a main display area of a display screen, an image of an active speaker in a video conference, wherein the active speaker is one of a plurality of users participating in the video conference over a network;
detecting a new active speaker of the plurality of users participating in the video conference;
determining resolutions of video streams received for each of the plurality of users participating in the video conference;
comparing the resolution of the video stream received for the new active speaker with the resolution of the video stream received for the active speaker;
in response to determining that the resolution of the video stream received for the new active speaker is lower than the resolution of the video stream received for the active speaker, continuing to provide for presentation in the main display area the image of the active speaker for a period of time adjustable during the video conference session based on a change to one or more characteristics of the network and one or more characteristics of the plurality of users; and
in response to determining that the period of time has elapsed, providing for presentation in the main display area of the display screen an image of the new active speaker corresponding to a highest resolution video stream received for the new active speaker, wherein the image of the new active speaker is provided for presentation in place of the image of the active speaker.

14. The method of claim 13, further comprising:
in response to determining, based on the comparison, that the resolution of the video stream received for the new active speaker is higher than the resolution of the video stream received for the active speaker, providing for presentation in the main display area of the display screen an image of the new active speaker corresponding to the resolution of the video stream received for the new active speaker, wherein the image of the new active speaker is provided for presentation in place of the image of the active speaker.

15. The method of claim 13, wherein the period of time is predetermined before the start of the video conference session.

16. The method of claim 13, further comprising:
detecting a change to one or more characteristics of the network and one or more characteristics of the plurality of users.

17. The method of claim 16, further comprising:
adjusting the period of time based on the detected change to one or more characteristics of the network and one or more characteristics of the plurality of users.

18. The method of claim 13, wherein the period of time is customized for each of the plurality of users participating in the video conference.

19. The method of claim 13, wherein the period of time is uniform for each of the plurality of users participating in the video conference.

20. The method of claim 13, wherein the period of time is set at half of the round-trip communication time between each of the plurality of users and a server configured for use in the video conference.

21. The method of claim 13, wherein the resolutions of the video streams received for each of the plurality of users is at least one of Quarter Video Graphics Array (QVGA), Video Graphics Array (VGA), and 720p.

* * * * *